United States Patent [19]

Link

[11] 4,200,414
[45] Apr. 29, 1980

[54] APPARATUS FOR THE DOSAGING OF BULK MATERIAL IN A PNEUMATICALLY CONVEYED STREAM

[75] Inventor: Otmar Link, Buchen-Götzingen, Fed. Rep. of Germany

[73] Assignee: AZO-Maschinenfabrik Adolf Zimmermann GmbH, Fed. Rep. of Germany

[21] Appl. No.: 897,697

[22] Filed: Apr. 19, 1978

[30] Foreign Application Priority Data

Apr. 19, 1977 [DE] Fed. Rep. of Germany ....... 2717145
Jun. 24, 1977 [DE] Fed. Rep. of Germany ....... 2728386

[51] Int. Cl.$^2$ ............................................ B65G 53/46
[52] U.S. Cl. ...................................................... 406/63
[58] Field of Search ................. 302/49; 222/194, 630, 222/633; 406/63, 68

[56] References Cited

U.S. PATENT DOCUMENTS

| | | | |
|---|---|---|---|
| 2,011,133 | 8/1935 | Yoss | 302/49 X |
| 2,740,672 | 4/1956 | Morrow | 302/49 |
| 2,946,626 | 7/1960 | Atkinson et al. | 302/49 X |
| 3,492,050 | 1/1970 | Colinet | 302/49 |

*Primary Examiner*—James L. Rowland
*Attorney, Agent, or Firm*—Craig & Antonelli

[57] ABSTRACT

In apparatus for dosaging bulk material in a pneumatic conveying stream the dosaging is effected by means of an apertured disc having an annular array of through holes of small diameter which, as the disc rotates about an axis, transfer discrete quantities of bulk material from a column thereof in a supply container to a pneumatic conveying conduit through which the apertured portion of the disc passes between sealing rings which act as stripping elements. The disc is located coaxially within the supply container and driven by a motor whose speed is adjustable to allow the dosaging quantity to be varied. The conveying conduit is taken through the supply container and interrupted at the position of the apertured disc where the conduit is provided with the sealing elements. The bulk material is fluidized by air drawn in through the bottom of the container and extracted through the top by means of a fan which supplies the conveying air to the conduit. The disc has large apertures, which allow the bulk material to pass through it, radially inwardly of the annular array of small holes.

9 Claims, 3 Drawing Figures

APPARATUS FOR THE DOSAGING OF BULK MATERIAL IN A PNEUMATICALLY CONVEYED STREAM

The invention relates to apparatus for the dosaging of bulk material in a pneumatically conveyed stream.

The dosaging of bulk materials, more particularly in powder form, presents considerable difficulties especially when it is necessary to meter small quantities. On the one hand the dosaging possibilities are influenced by the flow behavior of the bulk material, and on the other hand such bulk materials more particularly when under mechanical stress, for example under static pressure or the like, tend to cake together. For this reason the dosaging of such bulk materials in a continuous flow process is almost impossible. Therefore substantial use is made of non-continuous processes, wherein the bulk material is taken in individual batches from the supply container by means of rotating devices which have cavities of specific size, for example cellular wheel air locks, and supplied to a conveying conduit, a mixer, a processing machine or the like.

Cellular wheel air locks cannot be used when dosaging small quantities and where there are high standards expected as regards precision. Here, use is frequently made of apparatus wherein the bottom of the supply container is formed by a rotating disc which is provided at its upper side with recesses, grooves or the like. The bulk material fills these recesses under the action of the pressure of the column of bulk material resting on the disc. The disc is dimensioned so that the recesses or grooves after passing a stripping element, which in the simplest case is formed of the container wall, pass outside the container where the bulk material contained in the recesses or grooves is taken off. Because of the fixedly preset volume of the cavities formed by the recesses or grooves, there is a correspondingly constant dosage volume or, if the bulk material is of constant density, a constant dosage quantity. Although these dosaging apparatus give satisfactory results as regards precision in the case of bulk materials with poor flowing properties, they have the disadvantage that they operate non-continuously and cannot be used when it is desired to have a continuous stream which is constant as regards volume or quantity.

An object of the present invention is to construct an apparatus of this general type in such a manner that continuous and constant dosaging is possible. A further object is to allow continuous dosaging in the conveyed stream of material.

According to the invention there is provided apparatus for the dosaging of bulk material in a pneumatic conveying stream by means of a disc rotating about an axis, wherein the said disc is situated partly within a column of bulk material in a supply container whilst another portion of the disc is situated outside the column of bulk material, and the said disc has recesses in which as it rotates it takes up bulk material and delivers such material outside the column of bulk material after passing a stripping element, the said disc being constructed as an apertured disc with a plurality of through holes of small diameter, that portion of the apertured disc which is situated outside the column of bulk material being arranged as an apertured partition within a pneumatic conveying conduit between sealing rings which respectively abut against the two faces of the disc and act at the same time as stripping elements.

In use of apparatus constructed according to the invention the apertured disc runs within the column of material about a vertical or horizontal axis and takes up in its through holes a volume of bulk material corresponding to the cavity volume of the holes and transports this bulk material into the pneumatic conveying conduit outside the column of bulk material. In that region of the apertured disc which during rotational movement is situated between the sealing rings of the pneumatic conveying conduit, the bulk material is blown out of the through holes and conveyed away by the pneumatic conveying stream. Since owing to the rotational movement of the apertured disc and the uniform arrangement of the through holes the same number of holes always passes the conveying conduit per unit of time, the result is that the conveying stream is charged with a completely constant and uniform amount of material. When the disc enters between the sealing rings of the conveying conduit, these sealing rings act externally as stripping elements so that in fact only the bulk material persisting within the through holes can enter the conveying conduit. By varying the rotational speed the dosage quantity can be adapted to particular requirements.

An apparatus constructed in this way as proposed by the invention is useful in all cases where the bulk material has to be supplied to a consuming apparatus continuously and in a constant quantity. As an example of the use of the apparatus, attention will be drawn simply to pulverized coal firing systems, wherein the coal powder is supplied to the burner pneumatically and the conveying air at the same time acts as combustion air.

According to a preferred constructional form of the invention the apertured disc comprises through holes only in the region of an external annular portion of the disc, the width of the annular portion being slightly smaller than the diameter of the conveying conduit. This construction makes it, in principle, possible to use supply containers of any desired size in conjunction with conveying conduits of any desired diameter.

According to a further feature of the invention the conveying conduit is taken through the supply container and parallel to the axis of rotation of the apertured disc at least in the portion into which the apertured disc extends. This constructional form has the advantage that in spite of direct transfer of the bulk material from the supply container into a pneumatic conveying conduit with the interposed rotating apertured disc, any production of dust is substantially completely obviated, since the possible leakage regions between the apertured disc and the conveying conduit are situated within the supply container, whereas the conveying conduit itself can be sealed without any difficultly relatively to the supply container, since the connection involved is a static connection.

The diameter of the through holes in the apertured disc is advantageously smaller than the width of the sealing rings of the conveying conduit, so that between the conveying conduit on the one hand and the supply container or column of material on the other hand there is no open connection.

It is also advantageous if the diameter of the through holes of the apertured disc is equal to or larger than the height of the apertured disc. In this way the result is achieved that the through holes are filled in a satisfactory manner by the bulk material.

According to a further feature of the invention the supply container containing the bulk material comprises a fluidizing arrangement which loosens up the bulk material in the supply container and keeps it circulating to a certain extent if appropriate. The apertured disc can then be arranged with a spacing above the bottom of the supply container so that it rotates through the moving bulk material. In this case it is advisable if the apertured disc comprises, between its center and the annular portion comprising the through holes, several large apertures through which the bulk material can pass unhindered, so that the apertured disc only offers substantial resistance to the moving bulk material in the region of the through holes which have small diameters, with the result that the through holes become closed with the bulk material.

If the fluidizing arrangement consists of a fan and an air-pervious bottom portion arranged above the supply container bottom which is provided with air inlet openings, according to the invention this fan can be connected at its suction side to the supply container and at its pressure or delivery side to the conveying conduit. When the fan operates, a negative pressure is produced in the supply container and air is thereby drawn in through the inlet openings in the bottom through the air-pervious bottom portion. As a result, the bulk material in the supply container is enriched with air and fluidized. At the same time this fan is used for conveying the dosaged bulk material taken from the supply container, the conveying conduit being connected to the pressure side of the fan. This construction has the advantage that the fluidizing side and conveying side of the system form a closed circuit and any particles carried along during fluidization by the fan pass into the conveying conduit and do not have to be separated by special filter or separating arrangements.

The invention is described hereinafter, by way of example, with reference to a constructional form shown in the drawings, in which.

Figure 1:
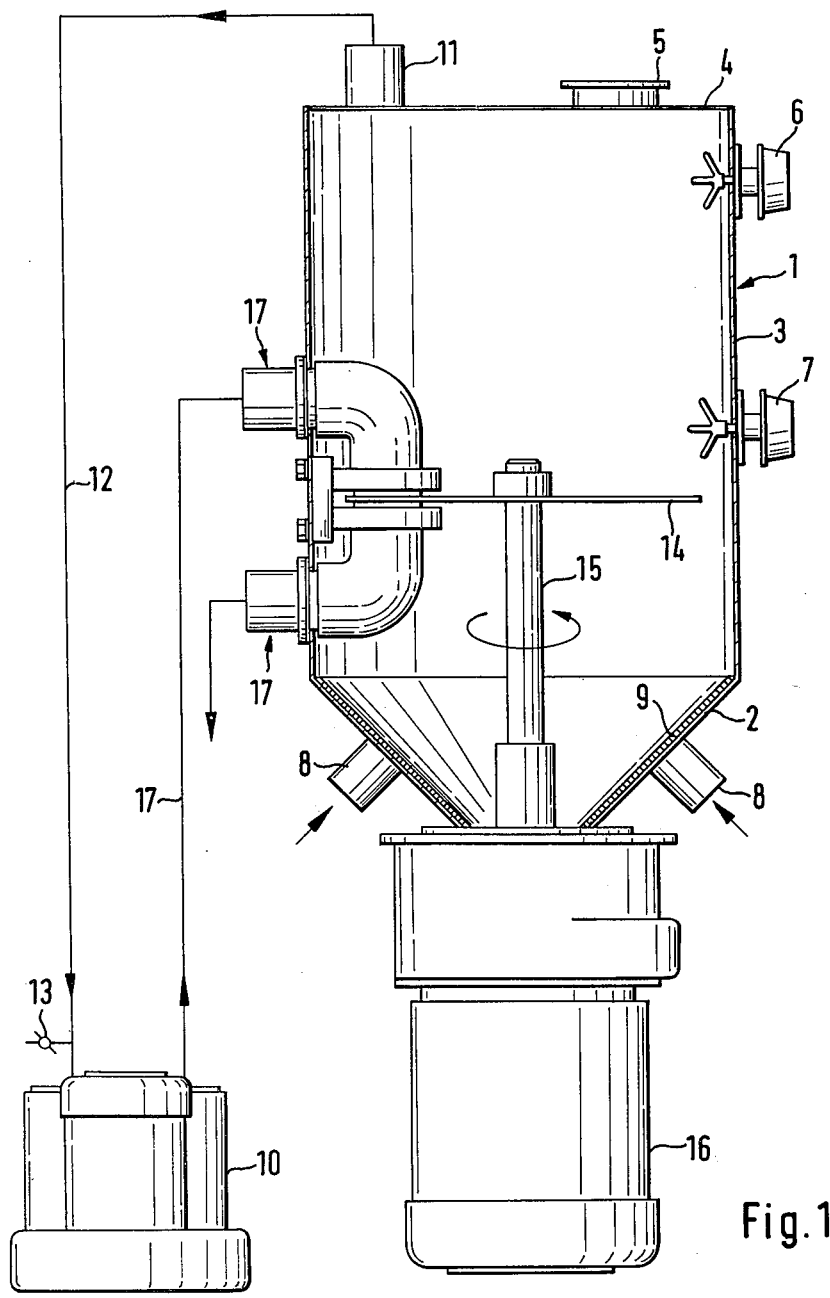
FIG. 1 shows a diagrammatic overall view of the apparatus, partly in section.
Figure 3:
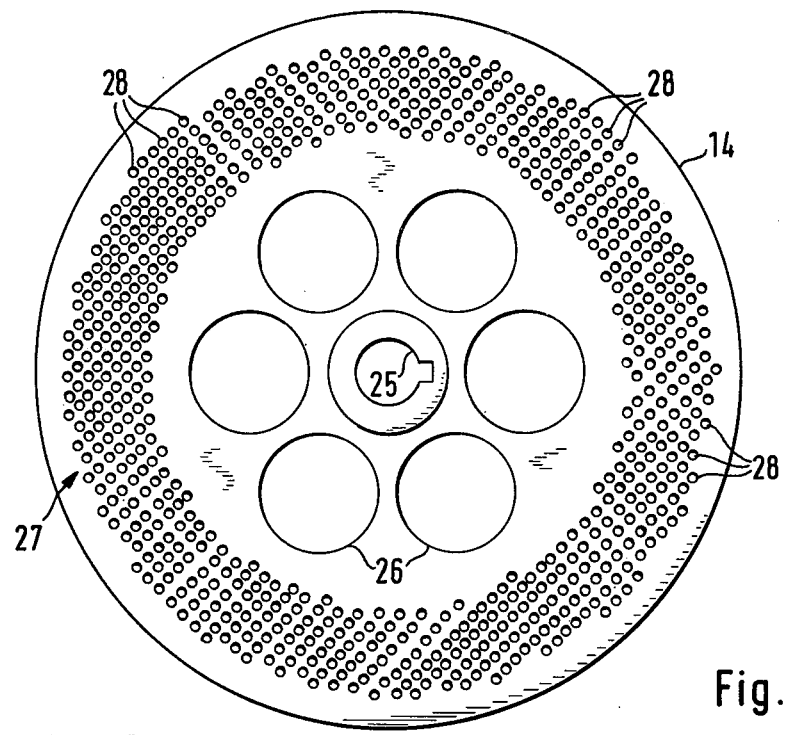
FIG. 3 shows a plan view of the apertured disc.

The apparatus comprises a supply container 1, comprising a conical bottom 2 and a cylindrical portion 3, and a cover 4. The cover 4 has a filling union 5 whilst in the cylindrical portion 3 of the supply container 1 there are arranged a fullness detector 6 and an emptiness detector 7 of known type. The conical bottom 2 comprises two or more air suction unions 8 which are open towards the atmosphere. An air-pervious intermediate bottom portion 9, made of textile fabric or the like, for example, is situated above the conical bottom 2. The supply container 1 can be subjected to a vacuum by means of a fan 10. For this purpose the supply container 1 comprises at its cover 4 a suction discharge union 11 which is connected by way of a suction conduit 12 with the suction side of the fan 10. Arranged in the suction conduit 12 is a throttle valve 13 by means of which the degree of vacuum can be controlled. The bulk material contained in the supply container 1 can thus be fluidized.

Situated within the supply container is a disc 14 which is mounted on a shaft 15 and can be rotated by means of a motor 16. In the illustrated constructional example, the supply container 1 is flange-connected directly to the motor housing 16.

Taken through the supply container 1 is a conveying conduit 17 which is interrupted at the level of the apertured disc 14. The apertured disc is situated for the greater part within the supply container, or in other words within the column of bulk material contained therein, but a smaller portion of the disc passes through the conveying conduit 17. This is shown in more detail in FIG. 2.

The conveying conduit 17 opens into the container by way of an inlet union 18 and issues from the container by way of an outlet union 19. The inlet union 18 and outlet union 19 are connected to one another by two elbows 20, 21. Associated with each elbow 20, 21, at the mutually facing ends, is a sealing ring 22, 23 respectively made for example of hard metal. Between the two elbows 20, 21 the conveying conduit is made to extend parallel to the axis 15 of the apertured disc 14. The sealing rings 22, 23 are arranged at a spacing from one another which corresponds to the height (i.e. the thickness) of the apertured disc 14. In order to allow precise alignment of the apertured disc 14 relative to this gap between the sealing rings 22, 23, there is provided a tongue-and-groove connection between the apertured disc 14 and shaft 15, which connection can be secured by means of a screw 24.

Figure 2:
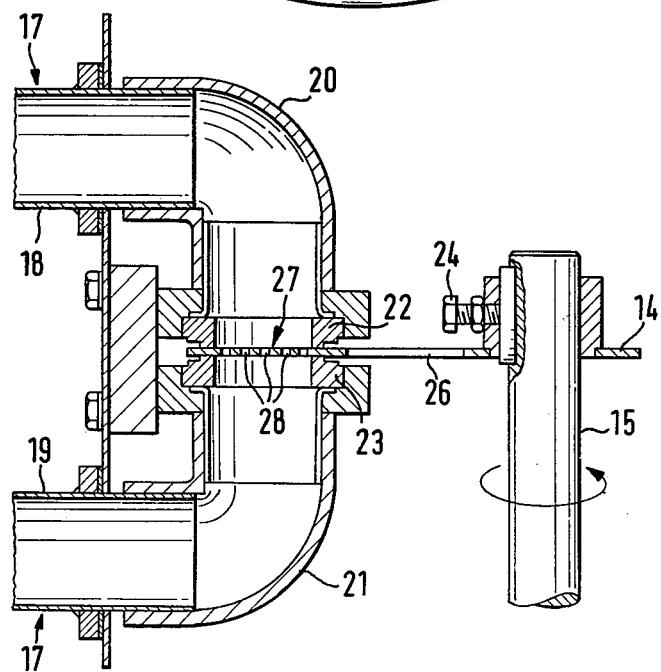
FIG. 2 shows an axial section of the dosaging arrangement on a larger scale.

The apertured disc 14 comprises at its center a bore 25 for placing on the rotary shaft 15. Situated about the bore 25 are a plurality of through apertures 26 of large size which, as FIG. 2 shows particularly, are arranged within the supply container 1 and the column of material situated therein, and through which the bulk material can flow when it is fluidized. In an outer annular portion 27 of the apertured disc 14 there are arranged a plurality of holes 28 of small diameter. The width of this annular portion 27 corresponds approximately to the diameter of the conveying conduit 17 and is situated on such a diameter circle of the apertured disc 14 as to correspond to the spacing of the axis of the parallel portion of the conveying conduit within the supply container from the axis of rotation 15. Thus, when the apertured disc 14 rotates, this annular portion always moves through between the sealing rings 22, 23. The bulk material taken up by the through holes 28 during rotational movement within the supply container 1 is blown out of the holes within the conveying conduit. The diameter of the through holes 28 is advantageously the same as or larger than the height of the apertured disc 14 and smaller than the width of the sealing rings 22, 23 in the region of the sealing surface lying on the apertured disc. The dosage quantity per unit of time is determined on the one hand by the cavity volume of the individual through hole 28, the number of through holes relatively to the cross-section of the conveying conduit, and the rotational speed of the apertured disc 14. Preferably, in order to allow the dosage quantity to be varied, the rotational speed of the apertured disc is adjustable, the driving motor 16 for the apertured disc 14 being regulable for this purpose.

What is claimed is:

1. Apparatus for dosaging of bulk material into a pneumatic conveying stream comprising a disc having a number of through holes and mounted for rotation about an axis, a column of bulk material, a pneumatic conveying conduit having a slot therethrough and sealing means on edges of said conduit slot, said disc and through holes being sized and positioned relative to said conduit sealing means and column for taking up bulk material in said through holes as said disc rotates within said column and passing between said sealing means in abutting contact therewith, with a plurality of said through holes being completely within said conduit to enable delivery of said bulk material at a substantially constant rate.

2. Apparatus according to claim 1, wherein the said through holes are provided only in the region of an outer annular portion of the disc, the width of the annular portion being somewhat smaller than the diameter of the conveying conduit.

3. Apparatus according to claim 1, wherein the conveying conduit is taken through the container and is parallel to the axis of rotation of the disc at least in that portion of said conduit having said slot and through which the disc extends.

4. Apparatus according to claim 1, wherein the diameter of the through holes of the apertured disc is smaller than the width of sealing rings forming the sealing means of the conveying conduit.

5. Apparatus according to claim 1, wherein the width of the through holes of the disc is at least as great as the height of the disc.

6. Apparatus according to claim 1, including drive means for the disc whereby the rotational speed of the apertured disc is adjustable.

7. Apparatus according to claim 1, wherein the column of bulk material comprises a supply container having a fluidising arrangement and the disc is arranged with a spacing above the bottom of the supply container.

8. Apparatus according to claim 7, wherein the disc comprises a plurality of large apertures between its centre and an annular portion thereof having the through holes.

9. Apparatus according to claim 7, wherein the fluidizing arrangement comprises an air-pervious intermediate bottom portion arranged above the bottom of the container provided with air entry openings, and a fan which is connected at a suction side to the supply container and at a delivery side to the conveying conduit.

* * * * *